US009570912B2

(12) United States Patent
Norrga et al.

(10) Patent No.: US 9,570,912 B2
(45) Date of Patent: Feb. 14, 2017

(54) AC/DC CONVERTER STATION OPERATED IN DEPENDENCE OF VOLTAGE OF CAPACITOR CONNECTED IN SERIES BETWEEN AC/DC CONVERTER AND AC NETWORK INTERFACE AND A METHOD OF OPERATING THE SAME

(75) Inventors: Staffan Norrga, Stockholm (SE); Tomas U Jonsson, Västerås (SE); Anshuman Shukla, Västerås (SE)

(73) Assignee: ABB RESEARCH LTD, Zurich (CH)

( * ) Notice: Subject to any disclaimer, the term of this patent is extended or adjusted under 35 U.S.C. 154(b) by 647 days.

(21) Appl. No.: 13/582,293

(22) PCT Filed: Mar. 4, 2010

(86) PCT No.: PCT/EP2010/052737
§ 371 (c)(1),
(2), (4) Date: Sep. 28, 2012

(87) PCT Pub. No.: WO2011/107151
PCT Pub. Date: Sep. 9, 2011

(65) Prior Publication Data
US 2013/0016541 A1    Jan. 17, 2013

(51) Int. Cl.
*H02H 7/125* (2006.01)
*H02J 3/36* (2006.01)
(Continued)

(52) U.S. Cl.
CPC .............. *H02J 3/36* (2013.01); *H02M 7/7575* (2013.01); *H02M 2007/4835* (2013.01); *Y02E 60/60* (2013.01)

(58) Field of Classification Search
CPC .......... H02J 3/36; H02J 1/102; H02M 7/7575; H02M 1/32; H02M 7/062; H02M 1/092; H02M 7/08; H02H 7/127; H02H 7/1252; G01R 19/0084
(Continued)

(56) References Cited

U.S. PATENT DOCUMENTS 4,555,750 A * 11/1985 Matsumura et al. ........... 363/37
5,694,306 A * 12/1997 Bjorklund et al. ............ 363/35
(Continued)

FOREIGN PATENT DOCUMENTS

WO    WO 96/09678 A2    3/1996
WO    WO 96/15573 A1    5/1996
(Continued)

OTHER PUBLICATIONS

Khatir et al. "Dynamic performance of a back-to-back hvdc station based on voltage source converters", Journal of Electrical Engineering, vol. 61, No. 1, pp. 29-36, 2010.*
(Continued)

*Primary Examiner* — Gary L Laxton
*Assistant Examiner* — Alex Torres-Rivera
(74) *Attorney, Agent, or Firm* — Birch, Stewart, Kolasch & Birch, LLP

(57) ABSTRACT

The present invention relates to an AC/DC converter station for interconnection of a DC transmission line and an AC network, the AC/DC converter station including an AC/DC converter and a control system configured to control the AC/DC converter. The AC/DC converter station comprises a capacitor connected in series between the AC/DC converter and the AC network, and a voltage measurement device arranged to measure the voltage across the capacitor. The AC/DC converter further comprises a control system connected to the voltage measurement device and arranged
(Continued)

to receive, from the voltage measurement device, a signal indicative of a measured voltage. The control system is arranged to perform the control of the AC/DC converter in dependence of the signal received from the voltage measurement device. The invention further relates to a method of operating an AC/DC converter station.

13 Claims, 8 Drawing Sheets

(51) Int. Cl.
*H02M 7/757* (2006.01)
*H02M 7/483* (2007.01)

(58) Field of Classification Search
USPC ........ 363/34, 35, 36, 37, 50, 51, 52, 53, 54, 65,363/67, 69, 81, 84, 89, 125, 127; 323/205, 206, 323/207, 208, 209; 361/15, 16, 17, 65, 67, 91.1; 307/116, 125, 126, 130, 151
See application file for complete search history.

(56) References Cited

U.S. PATENT DOCUMENTS

| | | | |
|---|---|---|---|
| 5,995,394 A * | 11/1999 | Svensson et al. | 363/51 |
| 6,075,349 A * | 6/2000 | Okayama | H02J 3/1814 323/207 |
| 6,331,765 B1 * | 12/2001 | Yamamoto | G05F 1/70 323/210 |
| 6,404,656 B1 * | 6/2002 | Jonsson et al. | 363/57 |
| 2008/0205093 A1 * | 8/2008 | Davies et al. | 363/35 |
| 2010/0226049 A1 * | 9/2010 | English et al. | 361/15 |

FOREIGN PATENT DOCUMENTS

| | | |
|---|---|---|
| WO | WO 01/24342 A1 | 4/2001 |
| WO | WO 2009/030275 A1 | 3/2009 |
| WO | WO 2009061219 A2 * | 5/2009 |

OTHER PUBLICATIONS

Vithayathil et al., "DC Systems with Transformerless Converters", IEEE Trasaction on Power Delivery, vol. 10, No. 3, Jul. 1995, pp. 1497-1504.

* cited by examiner

100

AC/DC CONVERTER STATION OPERATED IN DEPENDENCE OF VOLTAGE OF CAPACITOR CONNECTED IN SERIES BETWEEN AC/DC CONVERTER AND AC NETWORK INTERFACE AND A METHOD OF OPERATING THE SAME

TECHNICAL FIELD

The present invention relates to the field of High power transmission, and in particular to the field of AC/DC converter stations for use in power transmission.

BACKGROUND

In HVDC transmission systems of today, a transformer is conventionally connected between an HVDC converter and the AC grid to which the converter is connected. One purpose of such transformer is to prevent DC current interaction between the AC grid and the HVDC converter. DC currents may from time to time occur on the AC side of the converter, for example due to asymmetric switching of the converter switching elements. DC currents which are allowed to flow through the AC grid will typically cause problems in terms of saturation of transformers in the AC grid, increased risk for corrosion of network cabling, etc. For this reason, the permitted levels of DC current injected into the AC grid are very low, typically no more than a few percent of the rated AC current RMS value.

Transformers connected between an HVDC converter and an AC grid often serve further purposes, such as for example facilitating for voltage adaptation between different AC networks. However, in some circumstances, for example when the voltages of the different AC networks are well matched, voltage adaptation can be achieved by other means. By omitting the transformer from the connection between the HVDC converter and the AC grid, several advantages can be achieved. A transformer connected between an HVDC converter and an AC grid is typically large, and therefore costly, and generally has to be tailor-made for a particular HVDC system. Thus, by leaving out such transformers, considerable savings can be made in terms of manufacturing time, installation time and monetary expenses. Furthermore, energy losses which normally occur in such transformers will be eliminated.

Transformerless HVDC converter stations are discussed in "DC Systems with Transformer-less Converters", IEEE Transactions on Power Delivery, Vol. 10, No. 3, July 1995, pp. 1497-1504, wherein a transformerless thyristor-based HVDC station is disclosed. This publication proposes a solution to the problem of how to block common mode direct currents from entering the AC system wherein a coupled reactor is connected in series with both DC poles. By measuring the DC flux in the core of this reactor, the presence of a DC common mode current can be detected. Based on these measurements, the control of the firing of the thyristors of the HVDC station is adapted in such way that the DC common mode current is counteracted.

However, this solution is only effective in eliminating common mode DC currents. In general, it is also required to avoid differential mode DC currents. Therefore, another way of preventing DC currents to enter the AC grid is desired.

SUMMARY

A problem to which the present invention relates is how to prevent DC currents from entering an AC network connected to a transformer-less AC/DC converter station.

This problem is addressed by an AC/DC converter station for interconnection of a DC transmission line and an AC network. The AC/DC converter station includes an AC/DC converter and a control system configured to control the AC/DC converter. The AC/DC converter station comprises a capacitor connected in series between the AC/DC converter and an AC network interface to which an AC network can be connected. The AC/DC converter station further comprises a voltage measurement device arranged to measure the voltage across the capacitor and to deliver a capacitor voltage measurement signal indicative of a measured voltage. The control system is responsively connected to the voltage measurement device and arranged to receive, from the voltage measurement device, a capacitor voltage measurement signal indicative of a measured voltage. The control system is further arranged to perform the control of the AC/DC converter in dependence of a capacitor voltage measurement signal received from the voltage measurement device.

The problem is further addressed by a method of operating an AC/DC converter station, wherein the AC/DC converter station interconnects a DC transmission line and an AC network. The AC/DC converter station includes an AC/DC converter and a control system configured to control the AC/DC converter. The method comprises: measuring, using a voltage measurement device, a DC voltage across a capacitor connected in series between the AC/DC converter and the AC network to which the AC/DC converter station is connected; providing a capacitor voltage measurement signal indicative of the measured DC voltage to the control system; and performing, in the control system, the control of the AC/DC converter in dependence of the capacitor voltage measurement signal received from the voltage measurement device.

By the AC/DC converter station and method of operating an AC/DC converter station is achieved that any DC voltage appearing at the AC converter interference may be accurately estimated so that the control of the switching of the AC/DC converter can be adjusted to reduce any undesired component of such DC voltage, thereby mitigating any undesired DC current interaction between the AC grid and the AC/DC converter.

In one embodiment wherein the control system comprises a pulse width modulator arranged to generate a control signal to be delivered to the AC/DC converter, the control system is arranged to use a signal from the voltage measurement device in determining a reference converter voltage waveform, and to supply a signal indicative of said reference converter voltage waveform to the pulse width modulator.

The control system may be arranged to check, using a capacitor voltage measurement signal received from the voltage measurement device, whether the DC voltage across the capacitor is about to exceed an acceptable level, and if so, to disconnect the AC/DC converter from the AC network. Hereby is achieved that damage of the capacitor can be avoided in a short circuit or earth fault situation. The capacitor may alternatively or additionally be equipped with an over-voltage protection circuit to protect the capacitor from damaging voltages.

An AC/DC converter station may comprise a capacitor redundancy set connected in series between the AC/DC converter and the AC network. The capacitor redundancy set comprises at least two capacitors connected in series and provided with a by-pass loop having a switch, so that, in case of damage of a first capacitor, the first capacitor can be by-passed and a second capacitor can be introduced in series between the AC/DC converter and the AC network. Hereby is achieved that replacement of a damaged capacitor can easily be performed.

In an AC/DC converter station including one AC/DC converter, no DC voltage is typically desired at the AC converter interface. However, the present technology is also applicable to AC/DC converter stations wherein a non-zero DC voltage is desired at the AC converter interface. The control system can then be arranged to control the voltage at the AC converter interface of an AC/DC converter to have a non-zero DC voltage superposed on the rated AC voltage. This can for example be the case in an AC/DC converter station having separate converters for positive and negative DC voltage polarity.

The present technology is particularly useful in an AC/DC converter station where no transformer is connected in series between the AC/DC converter and the AC network interface, since the presence of a transformer would prevent DC currents from entering an AC network connected to the AC/DC converter station. However, the technology can also be useful in mitigation of undesired DC voltages at the AC converter interface of an AC/DC converter station which includes such transformer.

A power transmission system comprising an AC/DC converter station according to the present technology is further provided.

Further aspects of the invention are set out in the following detailed description and in the accompanying claims.

DETAILED DESCRIPTION

Figure 1:
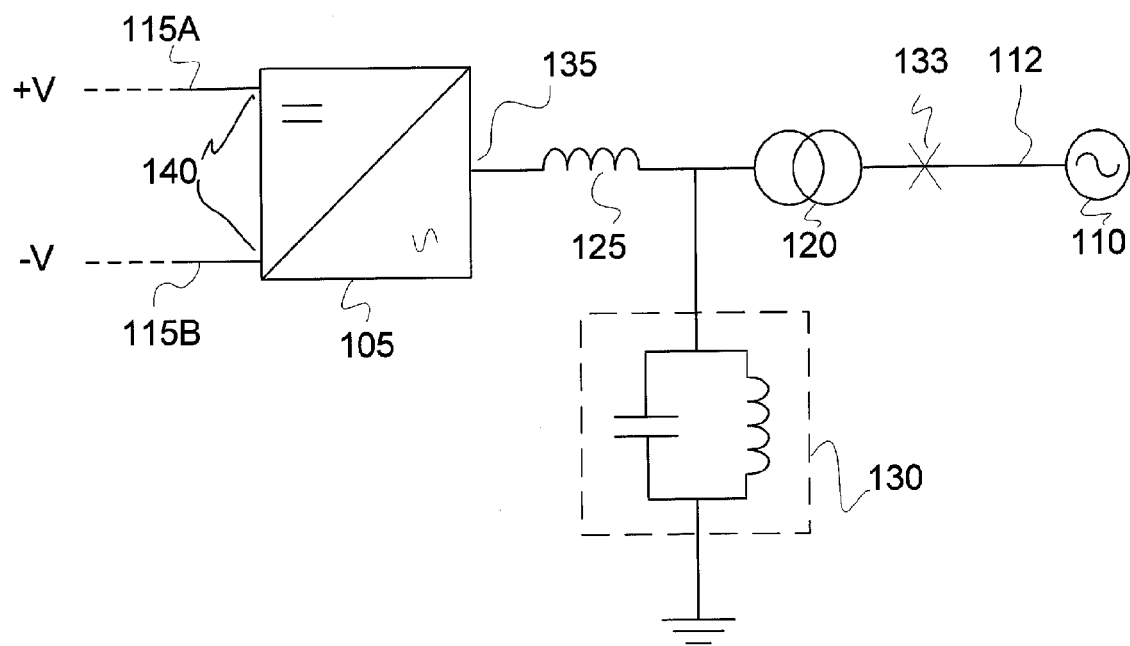
FIG. 1 is a schematic illustration of an example of an AC/DC converter station including a transformer.

FIG. 1 schematically illustrates an AC/DC converter station 100 comprising an AC/DC converter 105, which on its AC side can be connected to an AC network 110 (also referred to as an AC grid) via an AC network interface 112, and on its DC side to DC lines 115 A and 115B. The AC/DC converter station 100 comprises a transformer 120, via which the AC/DC converter 105 can be connected to the AC network 110 in a conventional manner. AC/DC converter station 100 typically comprises further equipment, of which a reactor 125, a grounded AC filter 130 and an AC circuit breaker 133 have been shown as examples. The reactor 125 is connected between AC converter interface 135 of AC/DC converter 105 and transformer 120 in FIG. 1 in order to provide inductance for fault current limitation and harmonic filtering, while AC filter 130 is connected between ground and a point between the reactor 125 and the transformer 120. The AC filter configuration shown in FIG. 1 is an example only, and other AC filter configurations could alternatively be used. The DC converter interface 140 of AC/DC converter 105 is also indicated in FIG. 1.

The present technology will in the following be discussed in terms of AC/DC converter stations 100 and AC/DC converters 105 which operate at high voltages, so called HVDC stations 100 and HVDC converters 105, respectively. However, the technology is equally applicable to AC/DC converter stations 100 operating at other voltages, such Medium Voltage (MV) or Low Voltage (LV) converter stations 100.

As mentioned above, it may in some circumstances be beneficial to design an HVDC station without a transformer 120. Since undesired DC voltages may from time to time appear on the AC converter interface 135 of the HVDC converter 105, for example due to asymmetric switching of the converter switching elements, means for preventing DC currents from entering the AC network 110 are desired.

In order to prevent DC currents from entering the AC network 110 in a transformer-less HVDC station, DC voltage and/or DC current measurements could be performed on the AC converter interface 135 of the HVDC converter 105. Signals indicative of the measured DC voltage/current could then be fed back to the HVDC converter control system, so that the switching of the switching elements of the HVDC converter 105 could be adjusted to reduce, or eliminate, the DC voltage/current.

However, this approach suffers from the drawback that the maximum allowed DC component normally only constitutes a small fraction of the overall grid side current/voltage. Thereby, measuring the DC component with sufficient accuracy becomes very difficult, and high measurement resolution becomes important.

According to the present technology, DC voltage measurements on the AC side of the HVDC converter can be facilitated under less strict resolution requirements by introducing a series connected capacitor for voltage measuring purposes between the HVDC converter 105 and the AC network 110.

The capacitor could for example be dimensioned so that the AC voltage drop across the capacitor at rated AC voltage will be of similar order of magnitude to the DC voltages which are likely to appear on the AC converter interface 135 of the HVDC converter 105.

In this way, a DC voltage which is built up across the capacitor can easily be detected and determined.

Since the capacitor 205 has a charge integrating effect, even a very small DC current can easily be detected, if the DC current lasts for a long enough time period, also when the magnitude of the DC current would otherwise make the DC current difficult or impossible to detect.

Figure 2:
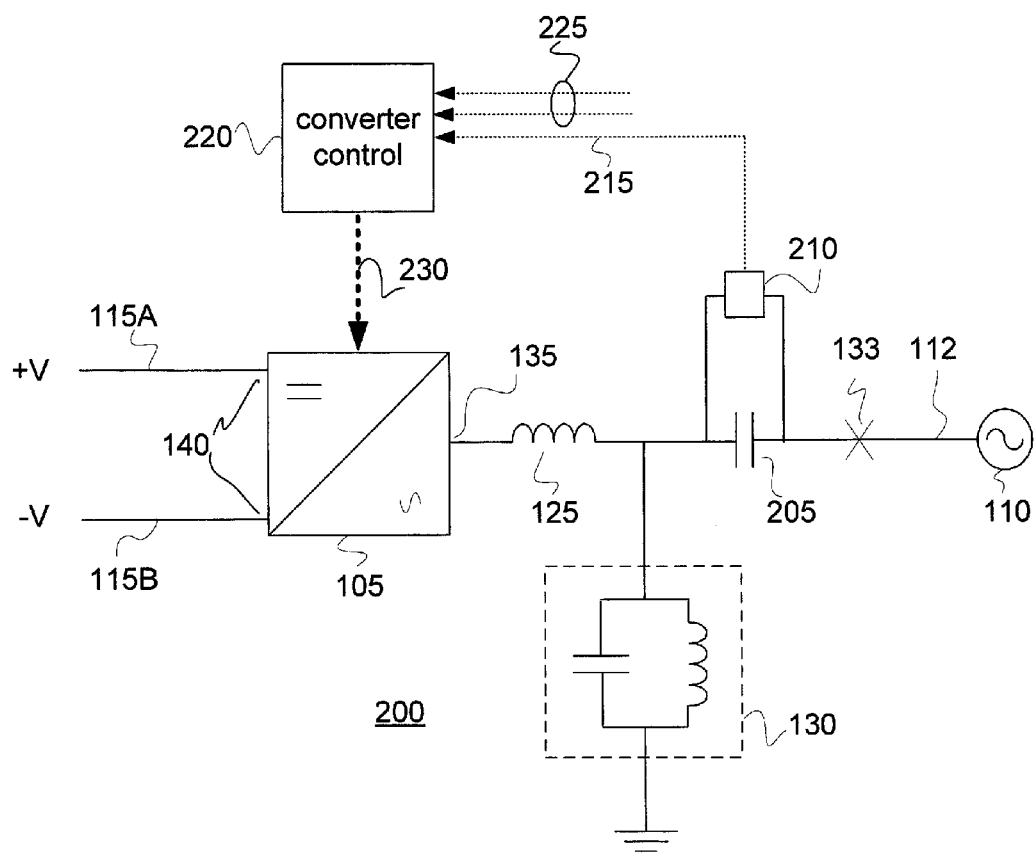
FIG. 2 is a schematic illustration of an example of a transformerless AC/DC converter station including a series-connected capacitor for voltage measurement purposes.

A transformer-less HVDC station 200 wherein a capacitor 205 is connected in series between the HVDC converter 105 and the AC network 110 is shown in FIG. 2. Apart from the transformer, the HVDC station 200 of FIG. 2 comprises the elements of FIG. 1, which have been indicated by the same reference numeral as shown in FIG. 1. FIG. 2 illustrates one phase of an HVDC station 200, and if more than one phase is required, a series-connected capacitor 205 could be provided for each electrical phase. In the following, for purposes of illustration only, references to further phases will generally be left out.

In HVDC station 200 of FIG. 2, a voltage measurement device 210 is connected to measure the voltage $U_C^{DC}$ across the capacitor 205, to generate a capacitor voltage measurement signal 215, or capacitor signal 215 for short, indicative of the measured voltage. The HVDC station 200 of FIG. 2 furthermore comprises an HVDC converter control system 220, or control system 220 for short, configured to receive capacitor signals 215 from the voltage measurement device 210.

Voltage measurement device 210 could for example be a resistive voltage divider, or any other suitable type of voltage measurement devices. The voltage measurement device 210 could be provided with analogue to digital conversion, in order to deliver a digital capacitor signal 215, or voltage measurement device 210 could be configured to deliver an analogue capacitor signal 215. Voltage measurement device 210 could for example be connected to control system 220 via an optical transmission link, in order to isolate the control system from the high potential of the capacitor 205. Voltage measurement device 210 could, if desired, include low pass filters for filtering out the AC component of the measured voltage, so that a capacitor signal 215 will be indicative of the DC component of the voltage across the capacitor 205 only. Alternatively, voltage measurement device 210 is configured to generate a capacitor signal 215 indicative of the measured voltage across the capacitor 205, including AC as well as DC components. Filtering of the capacitor signals 215 could be performed by the control system 220.

Control system 220 is configured to control the switching of HVDC converter switching elements (not shown in FIG. 2). An HVDC converter control system is typically configured to receive status signals 225 indicative of the status of the HVDC system, and to control the switching of the HVDC converter switching elements in dependence of the received status signals so that a specified status of the HVDC system is achieved. Examples of such status signals 225 could be signals indicative of the AC current and AC voltage on the AC side of the HVDC converter 105, signals indicative of the DC current and DC voltage on the DC side of the HVDC converter 105, etc. The control system 220 is configured to generate a control signal 230 to the HVDC converter 105 in order to control the switching elements of the HVDC converter 105. The control signal 230 could for example comprise a set of pulse width modulated signals.

In the HVDC station 200 of FIG. 2, an input of control system 220 is further responsively connected to a signal output of the voltage measurement device 210 in a manner so that the control system 220 can receive the capacitor signal 215 indicative of performed voltage measurements. In this way, the HVDC converter control system 220 can take $U_C^{DC}$-measurements into account in the control of the HVDC converter switching elements, and thereby reduce or eliminate any undesired DC voltage which appears on the AC converter interface 135 of the HVDC converter 105, so that any undesired DC voltage interaction between the HVDC converter 105 and the AC network 110 will be mitigated. The operation of the control system 220 in this regard will be further described in relation to FIGS. 4-7.

In order to allow for a high accuracy of the DC voltage measurements performed by voltage measurement device 210, the capacitor 205 could advantageously be designed to have a capacitance C such that the AC voltage drop across the capacitor 205 is of a similar order of magnitude to the DC voltage appearing at the AC converter interface 135 of the HVDC converter 105. The impedance $Z_c$ at frequency f of a capacitor having capacitance C is shown in expression (1):

$$Z_c = -\frac{f}{2\pi fC}. \qquad (1)$$

Thus, the AC voltage drop across the capacitor, $U_C^{AC}$, corresponds to:

$$U_c^{AC} = \frac{I_{AC}}{2\pi fC}, \qquad (2)$$

where $I_{AC}$ is the magnitude of the AC current.

Hence, if the desired AC voltage drop across the capacitor 205 at rated current $I_0$ is expressed as a fraction v of the rated AC voltage per (phase) $U_0$, then the desired capacitance C of capacitor 205 can be expressed as:

$$C = \frac{1}{2\pi f} \frac{I_0}{vU_0}, \qquad (3)$$

For example, if the magnitude of the anticipated DC voltage on the AC converter interface 135 of the HVDC converter 205 corresponds to a fraction w of the rated AC phase voltage $U_0$, and the DC voltage across the capacitor 205 can be accurately determined by voltage measurement device 210 if the magnitude of the DC voltage is at least a fraction p of the AC voltage drop across the capacitor 205, i.e. if $$\frac{U_C^{DC}}{U_C^{AC}} = \frac{wU_0}{vU_0} \gtrsim p \qquad (4)$$

then the capacitance C of the capacitor 205 could advantageously be selected to fulfil the following relation:

$$C \gtrsim \frac{1}{2\pi f} \frac{I_0}{U_0} \frac{p}{w} \approx \frac{1}{2\pi f} \frac{I_0}{U_0} A, \qquad (5)$$

where A corresponds to an approximation of the ratio of p to w. For example, for an HVDC station 200 connected to a 50 Hz AC network 110 wherein the rated AC (phase) voltage $U_0$ is 230 kV, the rated AC current $I_0$ is 2000 A, the magnitude of an anticipated DC voltage is 0.5% of the rated AC voltage, and wherein the voltage measurement device 210 can accurately measure a DC voltage $U_C^{DC}$ the magnitude of which reaches at least 1% of the AC voltage $U_C^{AC}$ across the capacitor 205, a suitable value for the capacitance C of the capacitor 205 could be 3 mF or larger. In this example, A takes the value 108. A suitable value of A could in many applications be 50 or larger, although smaller values could also be used, depending on the resolution of the voltage measurement device 210 and the expected DC voltage at the AC converter interface 135.

To select a capacitor 205 of a high capacitance furthermore has the advantage that the phase shift introduced by the capacitor 205 between AC current and voltage will be small, and thereby that the reactive power consumed by the capacitor 205 will be low.

The time lapse between the appearance of a DC voltage $U_{AC\text{-}side}^{DC}$ at the AC converter interface 135 of the HVDC converter 105 and the detection of the DC voltage will typically be independent on the capacitance C of capacitor 205, but will for example depend on the resolution of the voltage measurement device 210. If capacitor 205 has a higher capacitance C, the time required for $U_C^{DC}$ across the capacitor 205 to reach a particular fraction of $U_{AC\text{-}side}^{DC}$ while the AC voltage $U_C^{AC}$ across the capacitor 205 will be smaller. These effects approximately cancel each other. In applications wherein a speedy detection of DC voltages is desired, a voltage measurement device 210 of high resolution could advantageously be used.

Connecting a capacitor 205 between the HVDC converter 105 and the AC network 110 not only facilitates the accurate measurements of DC voltages on the AC converter interface 135 of the HVDC converter 105, but also achieves that DC currents will be prevented from entering the AC network 110 once the DC voltage across capacitor 205 has stabilised. The time required for stabilisation of $U_C^{DC}$ is proportional to the capacitance C, so that when C is selected in accordance with the above discussion, this blocking effect is typically primarily achieved for static or semi-static DC voltages, whereas short term DC voltages will not be blocked. Hence, a passive blockage of static or semi-static DC voltages is achieved by means of the capacitor 205. In implementations of the present technology where the resolution of the DC voltage measurement device 210 is high, and where a slightly higher capacitor-induced phase shift would be acceptable, a capacitor 205 of lower capacitance could be applied in order to block DC voltage on a shorter time scale.

In a short circuit or earth fault situation in the HVDC system of which HVDC station 200 forms a part, the current in the AC network interface 112 of HVDC station 200 could rapidly increase to a considerable value, and could for example reach 10 times the rated AC current, where up to half of this current magnitude could be a DC current. Hence, there is a risk that the capacitor 205 will be damaged in a short circuit situation due to excessive over voltage unless this aspect is considered in the design of the HVDC station 200. Damage of the capacitor 205 may be costly in terms of outage duration, since a damaged capacitor 205 would typically have to be replaced before the HVDC station 200 can operate normally after failure. Thus, it is highly desirable to avoid any damage to the capacitor 205.

In order to ensure that the capacitor 205 is not damaged in a short circuit situation, the capacitor 205 could be dimensioned so that the maximum anticipated DC voltage will not cause electric breakdown in the capacitor 205. Such dimensioning could for example involve a physically large capacitor with a highly voltage resistant isolation as the dielectric spacer.

However, by controlling the HVDC converter switching elements in dependence on a DC voltage appearing across series connected capacitor 205, the risk of a large DC voltage building up across the capacitor 205 is reduced. Thus, the capacitor 205 does not necessarily have to be dimensioned such that the capacitor 205 could withstand the highest anticipated voltage on the AC converter interface 135 of the HVDC converter, but a less voltage resistant capacitor 205 could be used than if no DC voltage feedback had been given to the control system 220. The closed loop control system, wherein the capacitor signal 215 is provided to the control system 220 in a feedback loop, will ensure that the DC voltage does not reach unacceptable levels.

In one embodiment of the present technology, the control system 220 is configured to disconnect the HVDC converter 105 if the measurements of $U_C^{DC}$ and/or the time derivate of $U_C^{DC}$-measurements indicate that $U_C^{DC}$ is about to exceed a certain level, in order to further ensure that the DC voltage across the capacitor 205 will not be allowed to reach levels where the capacitor 205 may be damaged.

By providing for the possibility of using a capacitor 205 of lower voltage rating, monetary costs could be greatly reduced, since a capacitor 205 dimensioned to withstand over voltages appearing in a short circuit situation is typically very costly.

Capacitor 205 could be designed in a variety of ways. For example, capacitor 205 could be a single capacitor unit, or a set of capacitor units connected in a suitable way. For example, two or more capacitor units could be connected in parallel to achieve a required current rating. Furthermore, a series connection of two or more such parallel units, or of two or more single capacitor units, could be employed in order to achieve a required voltage rating.

The voltage measurements across the capacitor 205 performed by voltage measurement device 210 will not only serve as a means for detecting any DC currents leaking into the AC network 110, but can also be used to monitor the status of the capacitor 205. Further arrangements for monitoring the status of the capacitor could additionally be implemented, if desired. For example, if the capacitor 205 comprises more than two capacitor units connected in parallel, any unbalance of the capacitors units can be detected in a known manner.

Any current carrying parts of the capacitor 205, such as for example the capacitor leads, could advantageously be designed to withstand at least the rated AC current. This could be achieved by selecting capacitor leads of sufficient cross-section and conductivity in a known manner.

Figure 3A:
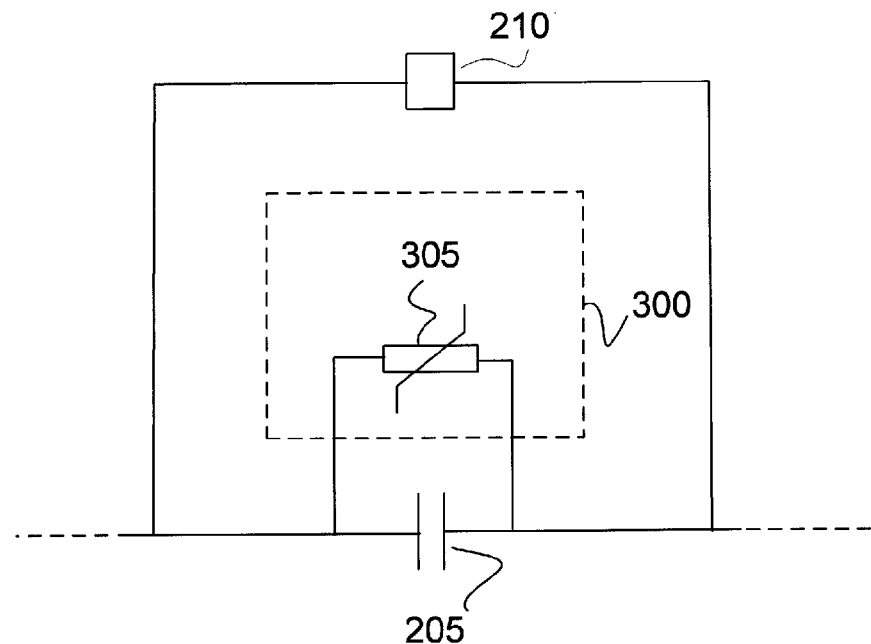
FIG. 3a is a schematic illustration of an example of an over-voltage protection circuit arranged to protect a capacitor from over-voltages.

If desired, the HVDC system 200 could be equipped with an over-voltage protection circuit to protect the capacitor 205 from excessive transient voltages which may otherwise damage the capacitor 205. An over-voltage protection circuit could for example include one or more elements exhibiting non-linear resistance characteristics such that high current conduction is obtained above a certain voltage level. Such elements could for example be ZnO varistors, or semiconductors exhibiting such non-linear characteristics, e.g. breakover diodes (BODs). One embodiment of a voltage protection circuit 300 is illustrated in FIG. 3a, wherein the over-voltage protection circuit 300 comprises a varistor 305 which is connected in parallel to the capacitor 205. The non-linear current-voltage characteristic of the varistor 305 can advantageously be chosen so that the varistor is highly resistive at any normal operating voltages, whereas at a suitable voltage above of the rated AC voltage, such as for example at 300% of the rated AC voltage, the resistance of the varistor 305 will drop, allowing for any break-down current to by-pass the conductor 205.

Figure 3B:
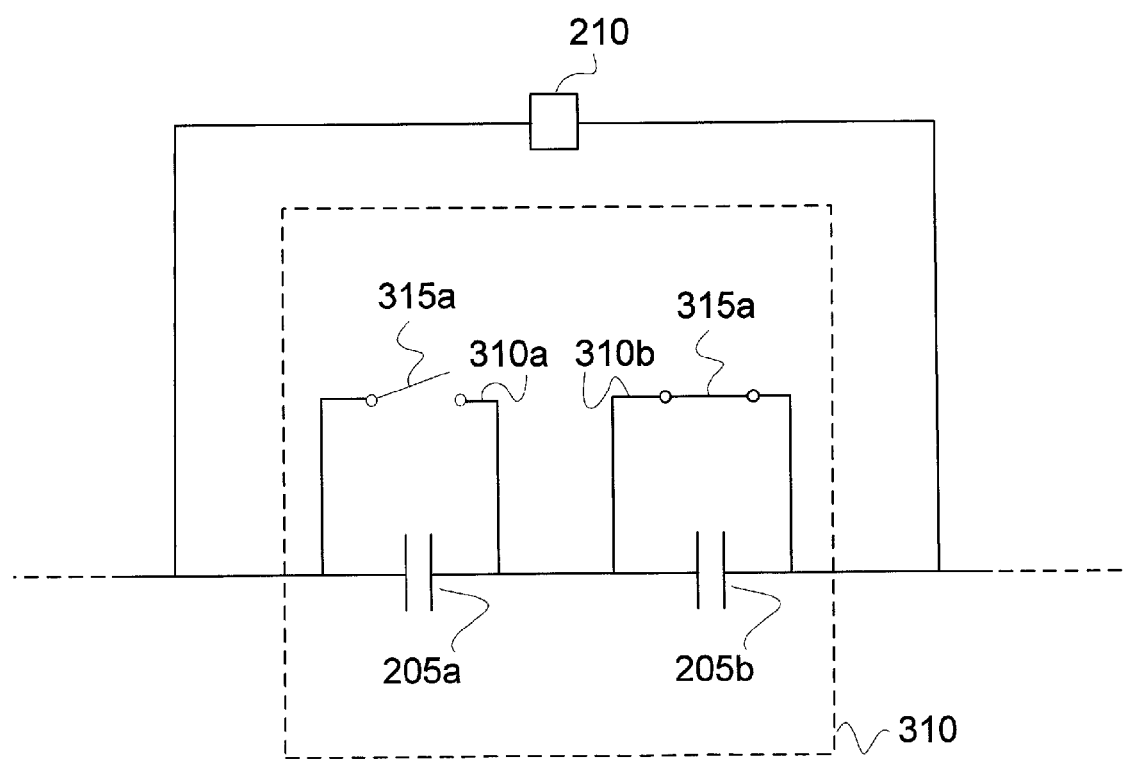
FIG. 3b is a schematic illustration of a set of capacitors having bypass switches and being connected in series in order to provide capacitor redundancy.

Furthermore, in order to provide redundancy to the HVDC station 200 in respect of the capacitor 205, HVDC station 200 could include a set of two or more capacitors 205 connected in series, where each capacitor 205 is dimensioned to serve as the voltage measurement capacitor in accordance with the above discussion, and where each capacitor 205 is provided with a bypass switch. Such a set of capacitors 205 is shown in FIG. 3b, wherein two capacitors 205a and 205b are series connected to form a capacitor redundancy set 310. Each capacitor 205a and 205b is provided with a bypass loop 310a/310b having a switch 315a/315b. Hence, a capacitor 205a/205b may be bypassed by closing the corresponding switch 315a/315b and may be re-introduced between the HVDC converter 105 and the AC network 110 by opening the switch 315a/b. Thus, if one of the capacitors 205a/b of a capacitor redundancy set 310 is damaged, the damaged capacitor 205a/b could be bypassed and another capacitor 205b/a could be introduced to replace the damaged capacitor 205a/b. The switches 315a/315b could for example be connected to control system 220, so that control system 220 could provide the switch 315a/b with an opening/closing signal, when required. As mentioned above, the status of a capacitor 205 could be monitored by means of the capacitor signal 215, and/or by means of measurements of other voltages in a capacitor 205. If desired, one or more of the capacitors 205 of a capacitor redundancy set 310 could be equipped with over-voltage protection circuits 300. The voltage measurement device 210 is shown to be connected to measure the voltage over the entire capacitor redundancy set 310. In order to provide voltage measurement device redundancy, different voltage measurement devices 210 could be connected to measure the voltage over different capacitors 205 of the set 310.

Figure 4:
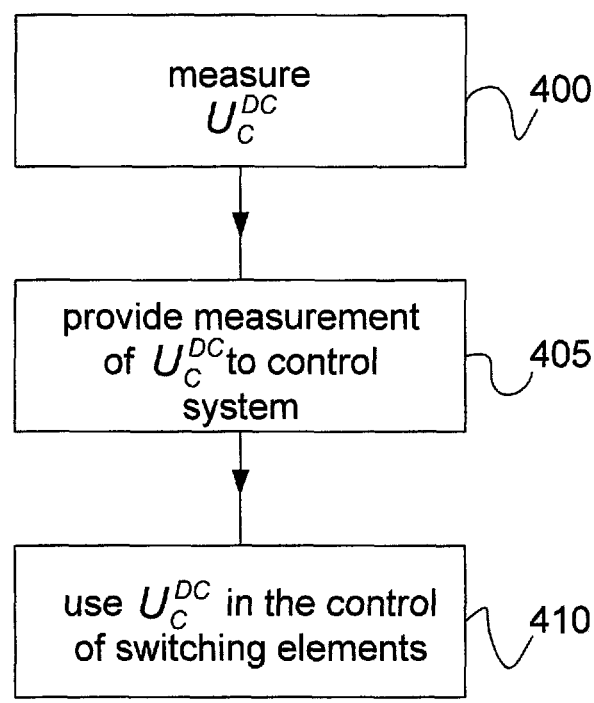
FIG. 4 is a flowchart schematically illustrating an embodiment of a method of operating an AC/DC converter.

Voltage measurement device 210 is configured to provide, to the control system 220, a capacitor signal 215 indicative of the DC voltage $U_C^{DC}$ measured across the capacitor 205, as illustrated in the flowchart of FIG. 4. In step 400 of FIG. 4, $U_C^{DC}$ is measured by voltage measurement device 210. In step 405, as signal indicative of the $U_C^{DC}$-measurement is fed by the voltage measurement device 210 to the control system 220. In step 410, the control system 220 uses the measurement of $U_C^{DC}$ in the control of the switching elements of the HVDC converter 105. Control system 220 typically further uses measurements of the AC current, $I^{AC}$, and of the AC voltage, $U^{AC}$, in the control of the switching elements of HVDC converter 105.

The sampling frequency of voltage measurement device 210 could for example be the same as the sampling frequency used for sampling of the AC current $I^{AC}$ and AC voltage $U^{AC}$. Alternatively, a different sampling frequency could be used. A slower sampling frequency could sometimes be sufficient, for example in the range of 1 kHz, since the capacitance C of the capacitor 220 introduces inertia to the DC voltage system.

Figure 5:
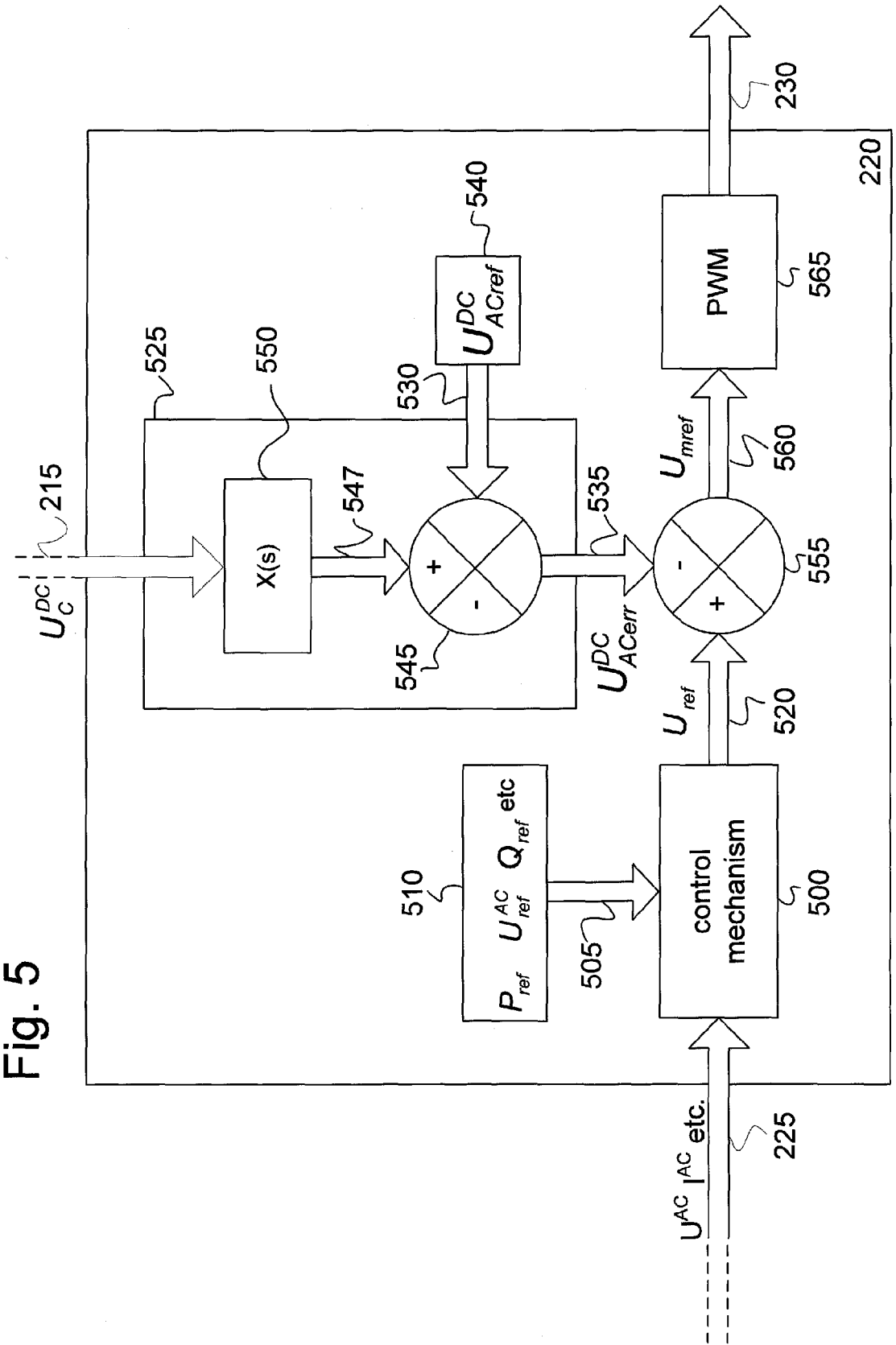
FIG. 5 is a schematic illustration of an embodiment of an AC/DC converter control system.

An example of an embodiment of the control system 220 is schematically shown in FIG. 5. Control system 220 of FIG. 5 can for example be used for the control of HVDC converters 105 of the voltage source converter (VSC) type, referred to as high voltage VSC converters. The control system 220 of FIG. 5 comprises a control mechanism 500 which is configured to generate a reference converter voltage waveform $U_{ref}$ in dependence of a set of status signals 225 and a set of reference signals 505. The status signal 225 could for example include signals indicative of measurements of the AC current $I_{AC}$ on the AC side of the HVDC converter 105, the AC voltage $U^{AC}$ at the AC converter interface 135, the DC voltage $U^{DC}$ at the DC converter interface 140, and/or measurements of any other suitable parameters. The set of reference signals could for example include signals indicative of a reference value for the converter AC voltage ($U_{ref}^{AC}$), for the converter active power ($P_{ref}$), for the DC voltage at the DC converter interface 140 ($U_{ref}^{DC}$), for the converter reactive power ($Q_{ref}$), and/or any other suitable reference value. The reference values could for example be stored in a memory 510.

The control mechanism 500 could be configured to generate the reference converter voltage waveform $U_{ref}$ in a known manner, for example as described in M. Khatir, S. A Zidi, A. Hadjeri and M. K. Fellah, "*Dynamic performance of a back-to-back hvdc station based on voltage source converters*", Journal of Electrical Engineering, vol. 61, no. 1, pages: 29-36, 2010, and to generate a signal 520 indicative of $U_{ref}$.

Control system 220 of FIG. 5 further comprises an AC-side-DC-voltage correction mechanism 525, configured to generate a DC voltage error signal 535 in dependence of a DC voltage reference signal 530 and the capacitor signal 215 indicative of the measured DC voltage across the capacitor 205. DC voltage error signal 535 is indicative of a DC voltage error $U_{ACerr}^{DC}$, which is an approximation of the deviation of the DC voltage at the AC converter interface 135 from the desired (reference) DC voltage at the AC converter interface, $U_{ACref}^{DC}$. A value of the reference DC voltage at the AC converter interface voltage $U_{ACref}^{DC}$ could for example be stored in a memory 540 (which could, if desired, be the same memory as memory 510). In the HVDC station 200 shown in FIG. 2, the value of $U_{ACref}^{DC}$ is typically zero. In other HVDC station configurations, such as the HVDC station 900 shown in FIG. 9, $U_{ACref}^{DC}$ could take a value which differs considerably from zero.

AC-side-DC-voltage correction mechanism 525 comprises a subtractor 545, configured to subtract the reference value $U_{ACref}^{DC}$ from a signal 547, which is based on received measurement(s) of $U_C^{DC}$, and to generate a DC voltage error signal 535 indicative of this difference. In the embodiment shown in FIG. 5, the AC-side-DC-voltage correction mechanism 525 further comprises a stabilizing controller 550, which is configured to receive and stabilize the capacitor signal 215 and to deliver, to the subtractor, a signal 547 indicative of the stabilized capacitor signal. Stabilizing controller 550 could for example be a stabilizing controller with a proper gain, such as for example PI controller. In alternative implementation, the capacitor signal 215 could be applied directly to the subtractor 545 as signal 547. In such implementation, the stabilizing controller 550 could be omitted, or configured to receive and stabilize the DC voltage error signal 535.

In the configuration shown in FIG. 5, it is assumed that capacitor signal 215 has been low-pass filtered so that the AC components have been removed. If the capacitor signal 215 received by control system 220 includes AC voltage components, control system 220 could include a suitable low pass filter for singling out the DC component.

In order to take the measured DC voltage across the capacitor 220 into account in the switching of the switching elements of HVDC converter 105, the control system is provided with a subtractor 555, which is configured to receive the signal 520 indicative of the reference converter voltage waveform $U_{ref}$, as well as the error signal 535 indicative of the DC voltage error on the AC side, $U_{ACerr}^{DC}$. Subtractor 555 is further configured to subtract a received value of $U_{ACerr}^{DC}$ from a received value of $U_{ref}$, to arrive at a modified reference converter voltage waveform $U_{mref}$, and to generate a modified voltage reference signal 560 indicative of $U_{mref}$.

Control system 220 of FIG. 5 further comprises a pulse width modulator (PWM) 565, which is configured to generate a set of pulse width modulated signals in response to a voltage reference signal, which in control system 220 of FIG. 5 is the modified voltage reference signal 560. The pulse width modulator 565 could operate in a known manner (see for example N. Flourentzou, V. G. Agelidis and G. D. Demetriades, "*VSC-based hvdc power transmission systems: an overview*", IEEE Trans. Power Electronics, pages:

592-602, vol. 24, no. 3, March 2009) to generate a control signal 230 in the form of a set of PWM signals to be fed to the HVDC converter 105 for the control of its switching elements.

The control system 220 is responsively connected to the voltage measurement device 210, as well as to further measurement devices (not shown) arranged to provide status signals 235, and configured to generate a control signal 230 to be used in the control of the HVDC converter 105 in response to signals received from such measurement devices.

The control system 220 of FIG. 5 is an example only, and other implementations of a control system 220 wherein measurements of the DC voltage across the capacitor 205 are taken into account in the control of the HVDC converter 105 can be employed. For example, if current vector control is applied in control system 220, where a reference converter voltage waveform is calculated by control system 220 so as to provide a voltage drop across a reactor 125 which would yield a desired current towards the AC network interface 112, then the measurements of the DC voltage across the capacitor 205 could be provided to the current vector control in order for the current vector control to take a corresponding DC current into account in the calculation of a modified reference converter voltage $U_{mref}$.

Figure 6:
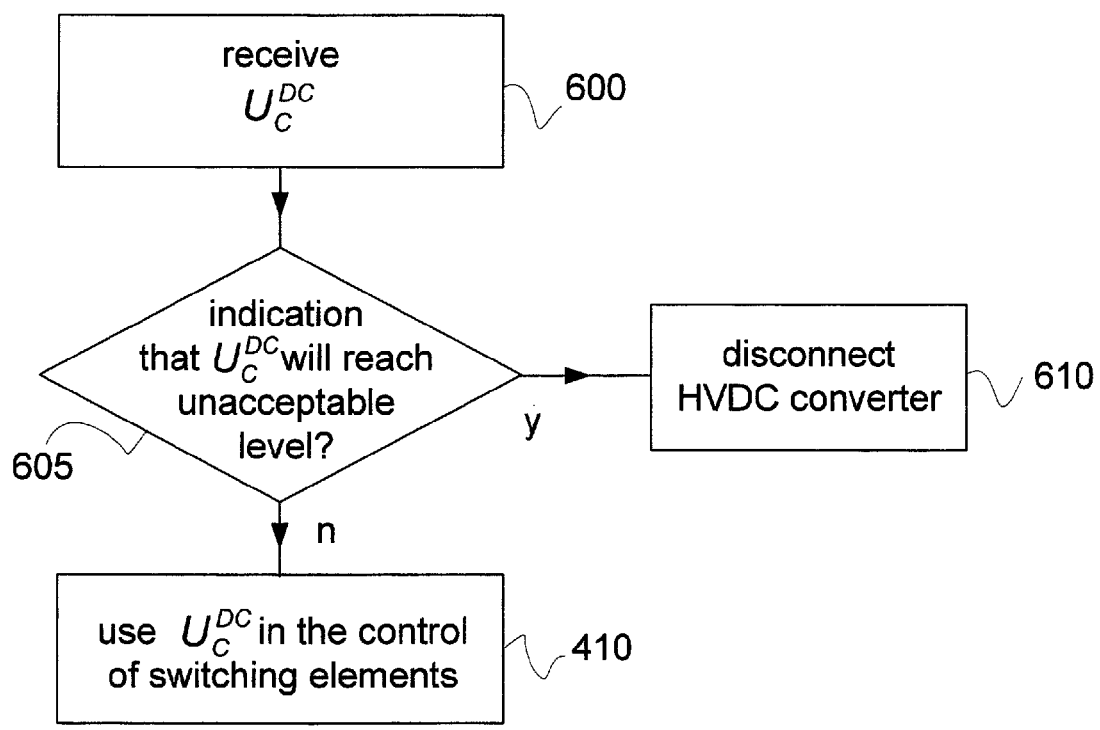
FIG. 6 is a flowchart schematically illustrating an aspect of an embodiment of an AC/DC converter control system.

As mentioned above, it might be advantageous to monitor the magnitude of the time derivative of $U_C^{DC}$ and/or the magnitude of Ugc in order to protect the capacitor 205 from over-voltages. The control system could be configured to disconnect the HVDC converter station 105 if the time derivate of $U_C^{DC}$ and/or the magnitude of $U_C^{DC}$, indicate that the voltage across the capacitor 205 is about to reach unacceptable levels. An embodiment of this aspect is illustrated in the flowchart of FIG. 6. In step 600, a measurement of $U_C^{DC}$ is received by control system 220 (this step corresponds to step 405 of FIG. 4, as seen by the control system 220). In step 605, it is checked whether the derivate of $U_C^{DC}$ and/or the magnitude of $U_C^{DC}$ indicate that $U_C^{DC}$ is about to reach unacceptable levels. If so, step 610 is entered, wherein the HVDC converter 105 is disconnected. Such disconnection could for example be performed by opening the AC circuit breaker 133, by switching of the switching elements of the HVDC converter 105, or in any other suitable way. However, if there is no indication that $U_C^{DC}$ is about to become unacceptably large, step 410 is entered, wherein the $U_C^{DC}$ measurement is used in the control of the switching elements of HVDC converter 105. Step 605 could for example include a comparison between the magnitude of the derivate of $U_C^{DC}$ with a derivative threshold $D_{th}$, so that if $$\left|\frac{dU_C^{DC}}{dt}\right| > D_{th},$$

then step 610 is entered. Other checks could alternatively be used in step 605, such as a check of whether the absolute level of $U_C^{DC}$ has exceeded a voltage threshold value; a combination of a check of the absolute value of $U_C^{DC}$ and the derivate of $U_C^{DC}$, etc. As discussed above, $U_C^{DC}$ is fed back to the control system 220 under normal operation in order to obtain a continuous mitigation of DC voltage at the AC converter interface 135.

A control system 220 operating according to the flowchart illustrated in FIG. 6 could for example be implemented in an HVDC system 200 wherein the capacitor 205 is equipped with an over-voltage protection system 300. This aspect of control system 220 will then reduce the risk of activation of the over-voltage protection circuit, and thus reduce the risk of DC current injection into the AC network 110. A control system operating according to the flowchart of FIG. 6 could also be implemented in an HVDC system 200 where the capacitor 205 is not equipped with an over-voltage protection circuit 300.

Figure 7:
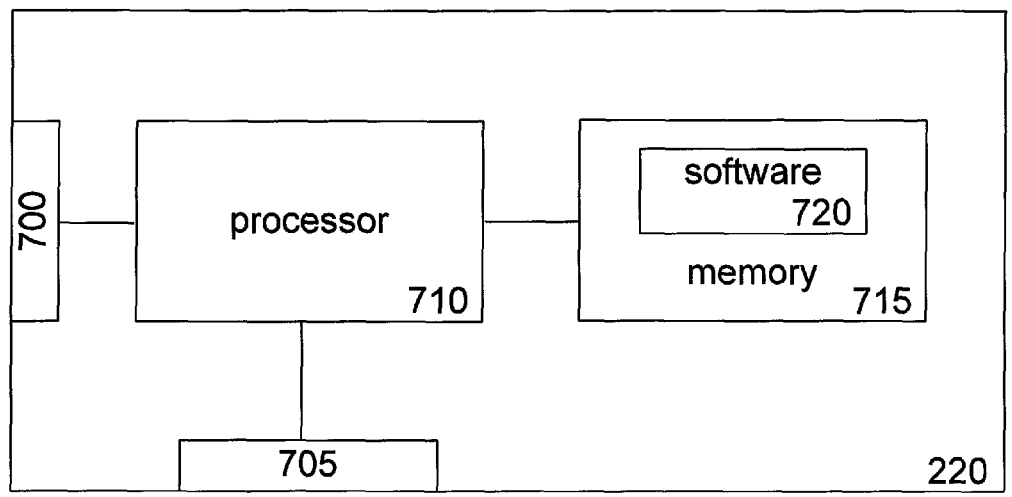
FIG. 7 is an alternative illustration of an embodiment of the AC/DC converter control system shown in FIG. 5.

Control system 220 could for example be implemented by means of a suitable combination of hardware and software. Control system 220 could for example be implemented in hardware only. FIG. 7 provides an alternative way of schematically illustrating an embodiment of control system 220 wherein at least part of the functionality of control system 220 is implemented by means of software. Control system 220 of FIG. 7 has an interface 700 for receiving capacitor signal 215 and status signals 225, and an interface 705 for delivering control signal 230. Control system 220 further comprises processing means 710, which is connected to interfaces 700 and 705 as well as to a computer program product 715 in the form of a memory. The memory 715 comprises computer readable code means that stores a computer program 720, which, when executed by the processing means 710, causes the control system 220 to perform the method of FIG. 4. In one embodiment, the computer program product 715 comprises program modules corresponding to the control mechanism 500, the AC-side-DC-voltage correction mechanism 525, the subtractor 555 and the PWM modulator 565. In other words, in this embodiment, the control system 220 is programmably configured to perform the tasks described in relation to FIG. 5. The computer program product 715 may further comprise program modules for performing the method of FIG. 6, program modules for controlling switches 315a/b of capacity redundancy set 310, etc.

Figure 8:
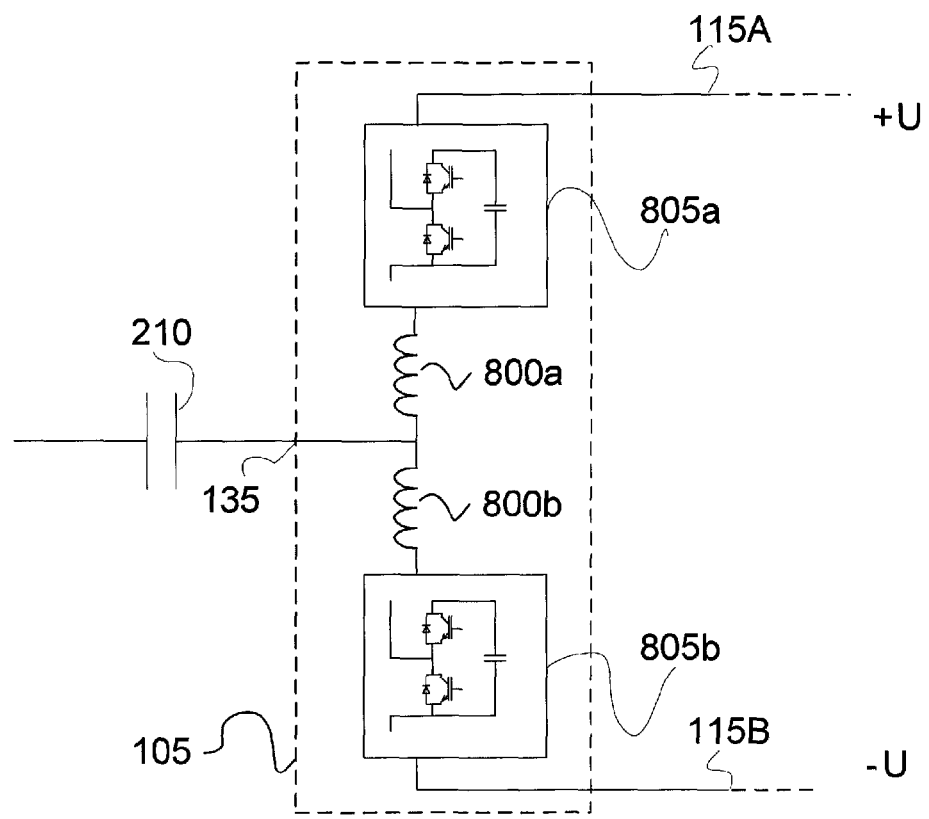
FIG. 8 is a schematic illustration of an embodiment of an AC/DC station comprising a series-connected capacitor for voltage measurement purposes.

In the HVDC system 200 shown in FIG. 2, the capacitor 205 is located between the AC network 110 and the connection point of the AC filter 130. However, the capacitor 205 could alternatively be located between the AC converter interface 135 and the connection point of the AC filter 130 (on either side of the reactor 125). One implementation of an HVDC station 200 comprising a series-connected capacitor 205 for voltage measurement purposes is shown in FIG. 8, wherein the HVDC converter 105 comprises two series connected reactors 800a and 800b which are connected between the AC converter interface 135 and a set of switching elements 805a and 805b, respectively. The set of switching elements 805a is connected to HVDC line 115 A, while the set 805b is connected to HVDC line 115b. The capacitor 205 is connected to a point between the reactors 800a and 800b. In this implementation, no further reactor 125 is needed, although a reactor 125 could, if desired be connected in series on either, or both, sides of capacitor 205.

Figure 9:
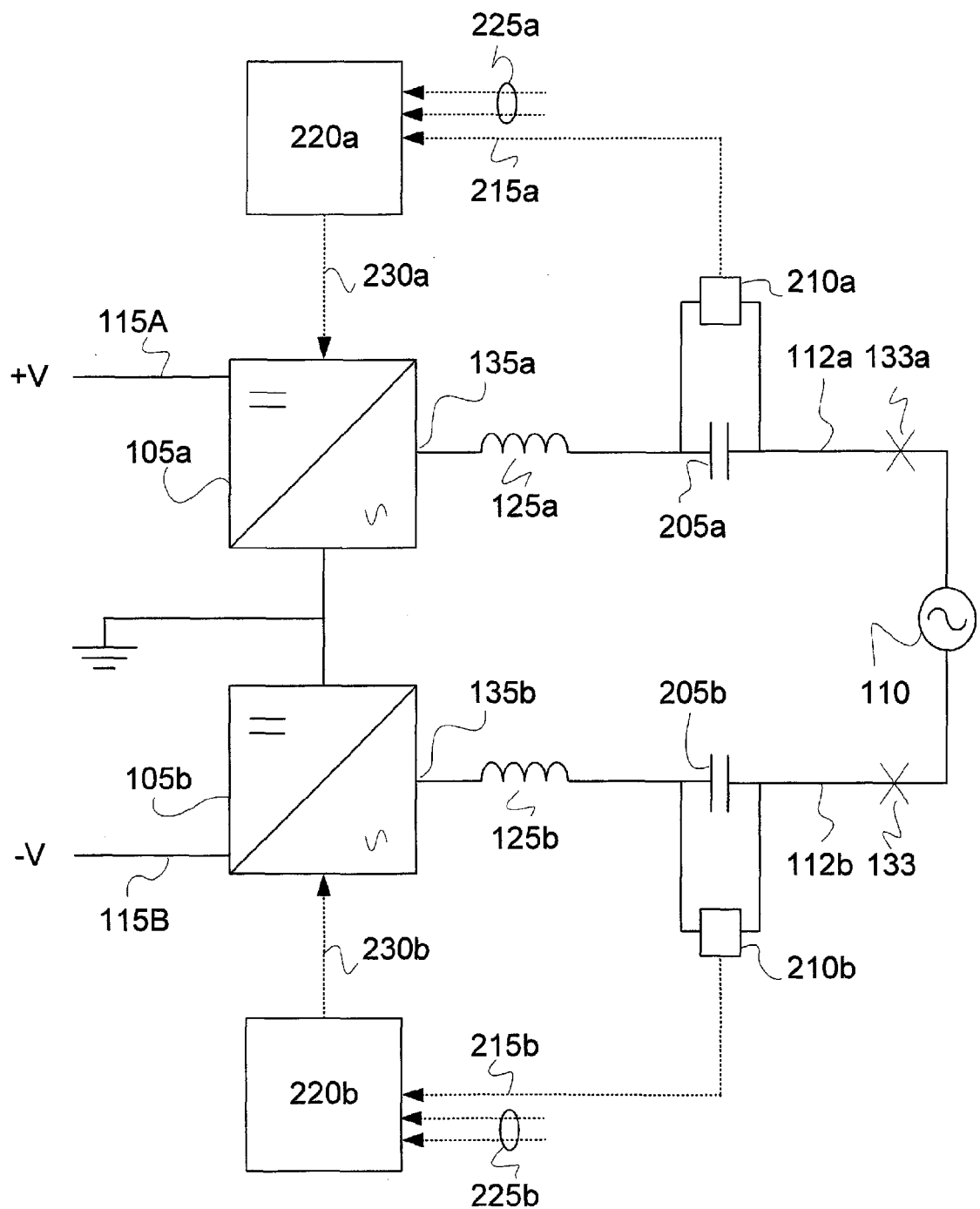
FIG. 9 is a schematic illustration of an example of a transformerless AC/DC converter station having separate converters for positive and negative DC voltage polarity.

FIG. 2 illustrates a single electrical phase of an HVDC station 200. The present technology is applicable to HVDC converter stations 200 having any suitable number of AC phases, and a capacitor 205 could be provide in the manner described above for each of the phases. Furthermore, FIG. 2 illustrates an HVDC station 200 wherein a single HVDC converter 105 is provided per electrical phase. However, the present technology is also applicable to an HVDC station wherein two HVDC converters 105 a and 105b are provided per electrical phase. One phase of such HVDC station 900 is schematically illustrated in FIG. 9, where separate HVDC converters 105a and 105b are used for positive and negative DC voltage polarity, respectively. In this configuration, a non-zero DC voltage is desired at the AC converter interface 135a/b of the HVDC converters 105a/b. This DC voltage could typically be half the voltage of the DC line 115A/115B to which the HVDC converter 105*a/b* is connected (i.e. ±v/2 in FIG. 9). Hence, a control system 220*a*/220*b* is configured to control the switching elements of HVDC converter 105*a* or 105*b* in dependence of the DC voltage $U_{C,a}^{DC}$ or $U_{C,b}^{DC}$ measured across the capacitor 205*a*/205*b* in a manner so that the non-zero DC voltage at the AC converter interface 135*a/b* is maintained at the desired value. An advantage of the capacitors 205*a* and 205*b* in this configuration is that the DC voltage measurements across capacitors 205*a* and 205*b* can be used to detect excessive over voltage, as discussed above. By providing such DC voltage measurements to the control systems 220*a* and 220*b*, any excessive over voltage may be counteracted, for example by control actions or by protective disconnection of the HVDC station from the AC network 110. The control system 220 of FIG. 9, although shown as separate control sub-systems 220*a* and 220*b*, could, if desired, be implemented as a single control system 220 controlling both converters 105*a* and 105*b*.

The technology is applicable to mono-polar HVDC systems, as well as to bipolar HVDC systems.

Although the disclosed technology has mainly been discussed in terms of AC/DC converter stations operating at high voltage (HVDC stations), the technology could equally well be employed in relation to converter stations of any rated voltage, including medium voltage and low voltage AC/DC converter stations. The technology is applicable to bidirectional AC/DC converters 105 arranged to support bidirectional power transmission, as well as to unidirectional AC/DC converters 105 arranged to operate as rectifiers or inverters.

The above described technology is applicable to AC/DC converter stations 200 comprising any type of AC/DC converters 105, such as for example voltage source converters (VSC) or current source converters (CSC). The technology is particularly useful in transformerless AC/DC converter stations 200, but could also be applied to AC/DC converter stations 100 wherein a transformer is present, if desired.

Although various aspects of the invention are set out in the accompanying independent claims, other aspects of the invention include the combination of any features presented in the above description and/or in the accompanying claims, and not solely the combinations explicitly set out in the accompanying claims.

One skilled in the art will appreciate that the technology presented herein is not limited to the embodiments disclosed in the accompanying drawings and the foregoing detailed description, which are presented for purposes of illustration only, but it can be implemented in a number of different ways, and it is defined by the following claims.

The invention claimed is:

1. An AC/DC converter station for interconnection of a DC transmission line and an AC network, the AC/DC converter station including an AC/DC converter and a control system configured to control the AC/DC converter, the AC/DC converter station comprising:
 a capacitor located at an AC side of the AC/DC converter and connected in series between the AC/DC converter and an AC network interface to which the AC network can be connected; and
 a voltage measurement device arranged to measure a DC voltage across the capacitor and to deliver a capacitor voltage measurement signal indicative of a measured voltage; and wherein
 the control system is responsively connected to the voltage measurement device and arranged to receive, from the voltage measurement device, the capacitor voltage measurement signal indicative of the measured voltage; and
 the control system is arranged to perform the control of the AC/DC converter in dependence of the capacitor voltage measurement signal received from the voltage measurement device, wherein
 the control system is arranged to check, using the capacitor voltage measurement signal received from the voltage measurement device, whether the DC voltage across the capacitor is about to exceed an acceptable level, and if so, to disconnect the AC/DC converter from the AC network.

2. The AC/DC converter station according to claim 1, wherein
 the control system comprises a pulse width modulator arranged to generate a control signal to be delivered to the AC/DC converter; and
 the control system is arranged to use the capacitor voltage measurement signal from the voltage measurement device in determining a reference converter voltage waveform, and to supply a signal indicative of said reference converter voltage waveform to the pulse width modulator.

3. The AC/DC converter station according to claim 1, wherein the capacitor is equipped with an over-voltage protection circuit.

4. The AC/DC converter station according to claim 1, comprising:
 a second capacitor, wherein the capacitor and the second capacitor are connected in series and provided with a bypass loop having a switch, so that, in case of damage of one of the capacitor and the second capacitor, the one of the capacitor and the second capacitor can be bypassed and the other one of the capacitor and the second capacitor can be introduced in series between the AC/DC converter and the AC network.

5. The AC/DC converter station according to claim 1, wherein
 the AC/DC converter station comprises two AC/DC converters and wherein the control system is arranged to control a voltage at the AC converter interface of the AC/DC converter to have a non-zero DC voltage superposed on a rated AC voltage.

6. The AC/DC converter station according to claim 1, wherein the capacitance C of the capacitor fulfils the relation $$C \gtrsim \frac{1}{2\pi f} \frac{I_0}{U_0} A$$

where $I_0$ is a rated AC current of the AC/DC converter station, $U_0$ is a rated voltage of the AC/DC converter station, f is a frequency of the AC network to which the AC/DC converter station is arranged to be connected and A corresponds to an approximation of a ratio of p to w and takes a value 50 or larger, where p is a fraction of a AC voltage drop across the capacitor and w is a fraction of $U_0$.

7. The AC/DC converter station according to claim 1, wherein:
 no transformer is connected in series between the AC/DC converter and the AC network interface of the AC/DC converter station.

8. The AC/DC converter station according to claim 1, wherein the AC/DC converter is a voltage source converter.

9. A power transmission system comprising the AC/DC converter station according to claim 1.

10. The AC/DC converter station according to claim 1, wherein an AC voltage is applied to the capacitor.

11. A method of operating an AC/DC converter station for interconnection of a DC transmission line and an AC network wherein the AC/DC converter station includes an AC/DC converter and a control system configured to control the AC/DC converter, the method comprising:

measuring, by using a voltage measurement device, a DC voltage across a capacitor located at an AC side of the AC/DC converter and connected in series between the AC/DC converter and the AC network to which the AC/DC converter station is connected;

providing a capacitor voltage measurement signal indicative of the measured DC voltage to the control system; and performing, in the control system, the control of the AC/DC converter in dependence of the capacitor voltage measurement signal received from the voltage measurement device, wherein checking, in the control system using capacitor voltage measurement signal(s) received from the voltage measurement device, whether the DC voltage across the capacitor is about to exceed an acceptable level, and if so, disconnecting the AC/DC converter from the AC network.

12. The method according to claim 11, wherein the performing in the control system comprises:

deriving, by use of the capacitor voltage measurement signal received from the voltage measurement device, an error signal in dependence of the difference between a reference DC voltage and the measured DC voltage across the capacitor ;

deriving, by use of at least one status signal indicative of measurements of voltage and/or current at the AC side and/or DC side of the AC/DC converter, a reference converter voltage waveform;

subtracting the error signal from the reference converter voltage waveform in order to obtain a modified reference converter voltage waveform; and using the modified reference converter voltage waveform as a reference in the control of the AC/DC converter.

13. The method according to claim 11, wherein an AC voltage is applied to the capacitor.

* * * * *